United States Patent [19]

Kelly

[11] Patent Number: 4,531,275
[45] Date of Patent: Jul. 30, 1985

[54] METHOD OF REPAIRING AUTOMOBILE BODIES

[76] Inventor: Edward F. Kelly, 3514 Palmer Dr., Rocky River, Ohio 44116

[21] Appl. No.: 460,295

[22] Filed: Jan. 24, 1983

[51] Int. Cl.³ .............................................. B23P 7/04
[52] U.S. Cl. ............................ 29/402.12; 29/402.14; 29/402.15; 29/402.05; 29/402.18
[58] Field of Search ............... 29/402.1, 401.1, 402.02, 29/402.06, 402.07, 402.09, 402.11, 402.14, 402.13, 402.18, 423; 206/582

[56] References Cited

U.S. PATENT DOCUMENTS 2,412,972 12/1946 Dean .................................. 29/402.13
2,795,523 6/1957 Cobb et al. ............................ 29/401
2,946,118 7/1960 Steck ................................. 29/402.18
2,953,847 9/1960 Reed .................................. 29/402.18

Primary Examiner—Howard N. Goldberg
Assistant Examiner—Vernon K. Rising
Attorney, Agent, or Firm—Maky, Renner, Otto & Boisselle

[57] ABSTRACT

A method of making repairs in sheet metal including cutting out the damaged metal, forming recesses around the perimeter of the hole formed by cutting away the damaged metal and attaching a patch behind the hole by means of fasteners whose heads are received in the recesses. A plastic filler material may then be used to fill the recesses and to bring the patch up to the level of the surrounding sheet metal.

6 Claims, 7 Drawing Figures

U.S. Patent  Jul. 30, 1985  4,531,275
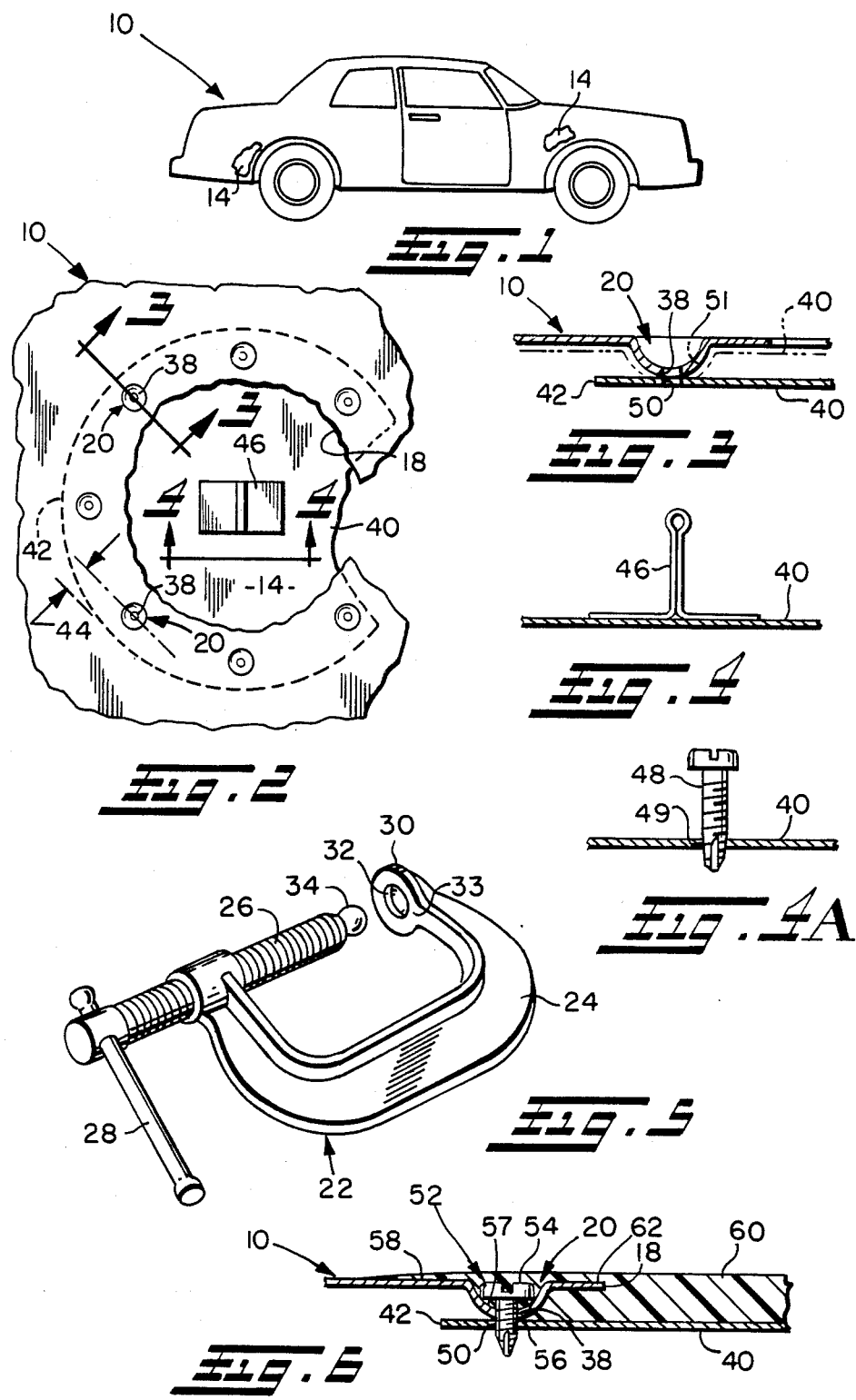

METHOD OF REPAIRING AUTOMOBILE BODIES

BACKGROUND OF THE INVENTION

The present invention relates to a method of repairing automobile bodies, and more particularly, to a method of repairing areas of sheet metal for automobile bodies which have been damaged as by accident or rust.

The sheet metal of an automobile body is subject to damage of various kinds. Where the damage is caused by rust or by relatively minor "fender benders" it has been possible to repair the damage using a body filler which may, for example, consist of a synthetic resin combined with a filler which is mixed with a hardener and then applied to fill the dented or rusted areas. Also, lead or some other metal with a low melting point has been used in the past to fill dents in automotive sheet metal, although this is less common today.

Where relatively large areas have been damaged, a reinforcing material such as a mat made of glass fibers has been used to support the body filler. The use of fiberglass reinforcing has proved difficult because there is no readily available method of attaching a reinforcing mat to the damaged area. Additionally, prior art practices have relied on the strength of the body filler itself to connect the body filler with the sheet metal of the automobile. For instance, it has been a common practice to drill a plurality of holes through the damaged sheet metal area to be filled so that when the body filler is applied it extrudes through the holes before hardening, thus forming a mechanical connection between the body filler and the automobile body.

SUMMARY OF THE INVENTION

The present invention provides a new and improved method of making repairs to damaged areas of automotive sheet metal. According to the present invention the damaged sheet metal is removed and a patch is secured behind the opening so formed by means of fasteners whose heads are received in recesses formed in surrounding undamaged areas. A depression or recess forming tool is used to make a plurality of recesses in the undamaged sheet metal in the area surrounding the excised, damaged portion. A hole is drilled through the center of each recess. A patch is then cut whose contour is slightly larger than the perimeter defined by the recesses formed in the bodywork and a series of holes aligned with the holes formed in the recesses are made in the patch. Thereafter fasteners such as sheet metal screws are used to secure the patch to the interior of the automobile body surface, with the heads of the sheet metal screws being received in the recesses with their heads flush with or lower than the undamaged surface of the body. Thereafter body filler is applied to fill the recesses and to cover the patch. Conventional sanding and finishing follows to complete the operation.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In the drawings:

FIG. 1 is a schematic illustration of an automobile with damaged areas in its sheet metal;

FIG. 2 is an enlarged fragmentary plan view of a portion of the sheet metal auto body shown during the process of repairing the sheet metal according to the present invention;

FIG. 3 is a fragmentary section through the sheet metal of FIG. 2, taken along the plane of the line 3—3 thereof;

FIG. 4 is a fragmentary section through the patch which is used to fill the hole in the sheet metal body of FIG. 2, taken along the plane of the line 4—4 thereof, showing one form of handle which may be used to maneuver the patch;

FIG. 4A is a fragmentary section similar to FIG. 4, but showing another form of handle;

FIG. 5 is a perspective view of a preferred form of forming tool for use in precipitating the present invention; and FIG. 6 is a fragmentary section generally similar to FIG. 3 but showing a completed repair.

DETAILED DESCRIPTION OF THE PREFERRED EMBODIMENTS

In FIG. 1 there is illustrated an automobile 10 including damaged areas 14 in its sheet metal which may be caused by rust or collision or other causes and may be located anywhere on the automobile. The damaged areas 14 are surrounded at least in part by undamaged areas of the automobile's body. The present invention provides a method for repairing the damaged areas 14 which is superior to various prior art methods of repairing damage in that it is more easily accomplished by the home repairman and provides a more rigid repair than is possible using such prior art methods.

FIG. 2 illustrates an enlarged view of the sheet metal surrounding the damaged area 14. According to the present invention the damaged area 14 is removed by cutting as with a hacksaw along line 18. This forms a hole in the sheet metal of the automobile body which is bounded by undamaged sheet metal. Where the damage to the sheet metal has been caused by rust or corrosion it is important that the excised or removed parts of the sheet metal include all of the rusted area so that the surrounding metal is sound and provides a good foundation for the repair to follow. It is, of course, entirely possible for the damaged area 14 to be located at an edge of the automobile body, in which case the line 18 which forms a boundary between damaged and undamaged areas would have two ends rather than being a closed loop as illustrated.

Once the damaged material has been removed by cutting along line 18, a plurality of recesses 20 are formed spaced outward from the perimeter 18 of the hole cut in the body. As shown in FIG. 3 the recesses 20 are generally hemispherical and are preferably formed using the depression forming tool 22 illustrated in FIG. 5. The tool 22 has a generally C-shaped body 24 and a threaded shaft 26 which is rotatable by means of a handle 28. The threaded shaft 26 is received in a threaded opening in the body, and upon rotation of the shaft, it moves toward or away from an anvil 30 formed at one extreme of the body 24.

The anvil 30 is formed with a hemispherical forming recess 32 which is surrounded by a flat annular surface 33. The threaded shaft 26 includes a cooperating ball end 34 opposite from the handle 28. When the tool 22 is placed over the edge of the sheet metal with the anvil 30 toward the interior of the automobile, the threaded shaft 26 is turned clockwise. The ball end 34 moves toward the anvil 30, and the annular surface 33 holds the anvil 30 abutting the inside of the sheet metal. As pressure is applied, the sheet metal clamped between the ball end 34 and anvil 30 is plastically deformed to form a hemispherical recess. To ensure that the tool has sufficient strength to deform the sheet metal to form the desired shape recesses, the tool should have a relatively thick body made of ductile iron, and the threaded shaft should desirably be made of hardened steel.

This process is repeated at intervals of two to four inches around the perimeter 18 until a plurality of recesses 20 have been formed. The recesses 20 are preferably located about one to one and one-half inches radially outward from the perimeter 18. Once the recesses 20 have been formed, a hole 38 is drilled through the center of each recess. The hole 38 thus passes directly through the deepest part of the recess and assures that the threaded fastener which will be inserted in the recess is centered therein.

Once the recesses have been formed and drilled, a patch 40 is cut. The patch 40 has a perimeter 42 which lies outside the recesses 20. Thus if the perimeter 18 were circular, the patch 40 would also be circular and have a diameter more than three inches larger than that of the perimeter 18. For perimeters of different shapes the patch is cut in an appropriate contour with a margin of material 44 extending away from the cut edge 18 beyond the recesses 20.

The patch 40 may be formed of any convenient material, but it is preferred to use galvanized steel since this is readily available and resists corrosion. Alternatively, the patch 40 may be made of a fine mesh screen, in which case the threaded fasteners 42 (discussed more fully below) would have to be equipped with nuts and washers to hold the patch securely. In either case, the patch 40 is placed behind, i.e. on the inside of, the opening defined by line 18, and may be maneuvered and held in place temporarily as by means of a handle 46 formed of a piece of tape which has been folded in half and partially adhered to itself, as illustrated in FIG. 4. Alternatively, a large screw 48 may be threaded into a hole 49 in the middle of the patch to serve as a handle as shown in FIG. 4A.

With the patch 40 held temporarily in place by means of the handle 46 or otherwise, the locations of each of the holes 38 is marked on the patch. For this purpose a pencil, a felt tip pen, or a sharp nail is suitable. The patch 40 is then removed and holes 50 (FIG. 3) corresponding to the holes 38 at the bottoms of each of the recesses 20 are drilled through the patch 40. At the same time, recesses 51 may be formed in the patch 40 corresponding to the recesses 20 in the sheet metal body as shown in phantom lines in FIG. 3 to permit the patch to better conform to the back side of the sheet metal body if desired. However, it has been found that the patch 40 will function just as well without the recesses 51. Also, it is possible to mark and drill only a few of the holes 38 and then insert the patch. The remaining holes 50 may then be drilled with the patch in place.

Once some or all of the holes 50 have been drilled, the patch 40 is again positioned behind or inside the edge 18 and each of the holes 50 is aligned with each of the holes 38. Thereafter threaded fasteners 52 are used to fasten the patch 40 in place. If all the holes 50 have not been drilled, they are drilled at this time and threaded fasteners 52 are screwed into place.

The threaded fasteners 52 may be for example No. 6 Pan Head Type A sheet metal screws one-half inch to three-quarters inch in length. Of course, it is also possible to use other threaded fasteners or to use rivets or nuts and bolts. When No. 6 sheet metal screws are used, the holes 38 and 50 may be conveniently made with a 3/32 inch diameter drill bit. If other types of fasteners are used, a hole appropriate to the size and type of fastener would be required.

As is illustrated in FIG. 6, the head 54 of the threaded fastener 52 is of a slightly smaller diameter than the recess 20 formed in the sheet metal of the body of the automobile. Thus when the threaded fastener 52 is tightened down fully, it not only draws the patch 40 snugly against the convex, exterior surface 56 of the recess 20, but also seats its head 54 against the concave interior surface 57 of the recess 20 so that the outermost portion of the head 54 is flush with or below the exterior surface 58 of the undamaged sheet metal. Should the head 54 of the sheet metal screw 52 protrude slightly beyond the surface 58 of the sheet metal of the automobile 10, it may be ground away using conventional grinding tools or a file until it is flush with the surface 58.

Once the patch 40 is secured in place by a plurality of sheet metal screws 52 or other suitable fasteners, conventional body filler 60 may be applied to fill the recesses 20 and to cover the patch 40. The body filler 60 will extend under the overhang 62 and in and around the convex surface 56 of the recesses 20 thereby being firmly interlocked with the sheet metal of the automobile body 10 and the patch 40. Once the body filler has hardened, it may be finished in a conventional manner using grinding, sanding and painting equipment.

Although described in relation to the repair of an automobile body, the present invention is equally applicable in the repair of other vehicles such as trucks, trailers, etc., and other objects made of sheet metal.

Although the invention has been shown and described with respect to a certain preferred embodiment, it is obvious that equivalent alterations and modifications will occur to those skilled in the art upon the reading and understanding of the specification. The present invention includes all such equivalent alterations and modifications and is limited only by the scope of the claims.

The embodiments of the invention in which an exclusive property or privilege is claimed are defined as follows:

1. A method of repairing damaged automobile sheet metal comprising the steps of removing damaged sheet metal from the damaged area, forming a plurality of dimples in the sheet metal at intervals around the perimeter of the damaged area with the dimples projecting rearwardly at the backside of the sheet metal and forming recesses in the front side of the sheet metal, forming holes in the dimples at the bottom of the recesses and corresponding holes in a patch, holding the patch against the backsides of the dimples and in underlying and coextensive relation to the damaged area while attaching the patch to the sheet metal by means of fasteners extending through the holes in the bottom of the dimples and the patch from the front side of the sheet metal, with the heads of the fasteners received in the recesses so formed and with portions of the patch rearwardly spaced by the dimples from the backside of the sheet metal to form gaps between the patch and sheet metal around the perimeter of the damaged area, and applying a body filler to the surface of the patch exposed through the damaged area and to the exterior of the sheet metal surrounding the damaged area to cover the damaged area and the recesses and fasteners heads contained therein so that the patch and fastener heads are completely covered and hidden from view when the repair is completed, and with some of the body filler being forced into the gaps between the patch and sheet metal around the perimeter of the damaged area to interlock securely the body filler with the sheet metal and patch.

2. A method as set forth in claim 1 wherein the patch is temporarily held in place to locate where the holes in the patch are to be formed prior to attaching the patch to the back side of the sheet metal by means of the fasteners as aforesaid.

3. A method as set forth in claim 2 wherein a piece of tape is used to form a handle on the front side of the patch for grasping by the hand to temporarily hold the patch against the back side of the sheet metal during attachment thereto by the fasteners.

4. A method as set forth in claim 2 wherein a screw is threaded into a hole in the central region of the patch to form a handle on the front side of the patch for grasping by the hand to temporarily hold the patch against the back side of the sheet metal during attachment thereto by the fasteners.

5. A method as set forth in claim 1 wherein said step of attaching the patch includes tightening the fasteners to draw the patch against the back side of the automobile sheet metal and to draw the heads of the fasteners into the recesses.

6. A method as set forth in claim 5 wherein the fasteners are threaded to permit tightening thereof by screwing the fasteners into the patch.

* * * * *